(12) United States Patent
Chan et al.

(10) Patent No.: US 7,487,494 B2
(45) Date of Patent: Feb. 3, 2009

(54) APPROACH TO MONITOR APPLICATION STATES FOR SELF-MANAGING SYSTEMS

(75) Inventors: Hoi Yeung Chan, Stamford, CT (US); Trieu C Chieu, Scarsdale, NY (US); Jeffrey Owen Kephart, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/909,760

(22) Filed: Aug. 2, 2004

(65) Prior Publication Data

US 2006/0026570 A1 Feb. 2, 2006

(51) Int. Cl.
*G06F 9/44* (2006.01)
(52) U.S. Cl. .................. 717/127; 717/131
(58) Field of Classification Search .............. None
See application file for complete search history.

(56) References Cited

U.S. PATENT DOCUMENTS

| | | | | |
|---|---|---|---|---|
| 5,655,081 | A * | 8/1997 | Bonnell et al. | 709/202 |
| 6,223,201 | B1 * | 4/2001 | Reznak | 718/102 |
| 6,442,750 | B1 * | 8/2002 | Lopes et al. | 717/126 |
| 6,473,895 | B1 * | 10/2002 | Lopes et al. | 717/128 |
| 6,856,942 | B2 * | 2/2005 | Garnett et al. | 702/183 |
| 2004/0153823 | A1 * | 8/2004 | Ansari | 714/38 |
| 2005/0114826 | A1 * | 5/2005 | Barthram | 717/100 |

OTHER PUBLICATIONS

Kiczales, G., Hilsdale, E., Hugunin, J., Kersten, M., Palm, J., Griswold, W. Getting Started with ASPECTJ. Communications of the ACM, vol. 44, Issue 10, pp. 59-65, Oct. 2001.*
Low, Tina. Designing, Modelling and Implementing a Toolkit for Aspect-oriented Tracing (TAST). Siemens Corporate Technology Software and Engineering Department, Oct. 2, 2002.*
Gschwind, T., Oberleitner, J. Improving Dynamic Data Analysis with Aspect-Orientd Programming. Software Maintenance and Reengineering, pp. 259-268, Mar. 26-28, 2003.*

(Continued)

*Primary Examiner*—Tuan Q Dam
*Assistant Examiner*—Cheneca P Smith
(74) *Attorney, Agent, or Firm*—George A. Willinghan; August Law Group, LLC

(57) ABSTRACT

The present invention is directed to systems and methods that treat the monitoring of a software application as a separate and independent concern from the software application itself. The present invention utilizes aspect oriented programming to intercept, analyze, decompose the application states of a software application and then to link appropriate non-invasive constructs into the software application code to provide application state information to an autonomic manager through a plurality of sensors. The autonomic manager analyzes the application state information for compliance predefined parameters, and takes appropriate corrective action including modifying the software application states using a plurality of effectors. The sensors and effectors are linked as non-invasive constructs to the software application, and in aspect oriented programming constitute aspects. In order to prevent any adverse or undesirable effects to the software application as a result of the application state analysis and selected action, a safety mechanism is included in communication with the effectors.

28 Claims, 4 Drawing Sheets

OTHER PUBLICATIONS

Jeff O. Kephart, David M. Chess, "The Vision of Autonomic Computing", Computer Journal, IEEE Computer Society, Jan. 2003 issue.

Harold Ossher and Peri Tarr, "Using Multidimensional Separation of Concerns to (Re)shape Evolving Software", Communications of the ACM, vol. 44, No. 10, pp. 43-50, Oct. 2001.

Tzilla Elrad, Mehmet Aksits, Gregor Kiczales, Karl Lieberherr, and Harold Ossher, "Discussing Aspects of AOP", Communications of ACM, vol. 44, No. 10, pp. 33-38, Oct. 2001.

* cited by examiner

APPROACH TO MONITOR APPLICATION STATES FOR SELF-MANAGING SYSTEMS

FIELD OF THE INVENTION

The present invention is directed to autonomic monitoring of software applications.

BACKGROUND OF THE INVENTION

As the complexity of software applications and systems increases, building systems with self-managing or autonomic features becomes increasingly important. Monitoring applications and taking corrective actions when exceptions occur is a common approach to self-managing in software applications. In order to provide self-managing functionality to a software application, a set of sensors is connected to the software application by creating and implementing the corresponding interfaces. This requires modifying the source code of the software application and the sensor if the interfaces are not already available. However, the availability of well documented source code is often limited. This limitation is especially acute for legacy systems where the source code is often unavailable and poorly annotated. In addition, building such self-managing systems is hindered by a lack of available generic monitoring tools that can be used for a variety software applications running on various hardware platforms. If source code is not available, or it is too costly to change and test the source code, it becomes very difficult to add such monitoring functions to software applications, limiting the application of autonomic behavior in these applications.

Therefore, monitoring systems are typically application specific and are created contemporaneously with the development of the software applications. Traditionally, building self-managing features into a software application requires that the specific requirements be considered and included in design time. i.e. at the time the software application itself is created. Even given the availability of the source code, the sheer number of events that potentially need to be monitored make the integration of self-monitoring difficult and substantially increase the complexity and cost of developing the software applications.

Therefore, a need exists for systems and methods that can provide autonomic management to software applications in general and specifically to existing legacy software applications when source code is not available or when it may be prohibitively expensive and time consuming to modify and re-test the source code. These self-managing systems and methods would preferably be generic and not platform specific so that they could be developed once and applied across a wide variety of applications. In addition, the software application being monitored would not be modified or adversely effected by the monitoring system.

SUMMARY OF THE INVENTION

The present invention is directed to systems and methods that treat the monitoring of a software application as a separate and independent concern from the software application itself. The present invention utilizes tools such as aspect oriented programming tools together with sensors and effectors to intercept, analyze and decompose the application states of a software application and then to link appropriate non-invasive constructs into the software application code, for example object code, native code or JAVA byte code, to provide information regarding the software application states. This application state information includes the values of the variables within the application and the execution or sequence of processes within the software application. The linking of the non-invasive constructs is conducted without affecting the logic of the software application, and is conducted at run time.

The application state information is provided to an external entity, which could be an autonomic manager that manages an application or a group of applications. The autonomic manager is created to monitor one or more software applications and is capable of collecting and analyzing that information for compliance with one or more parameters. To monitor the state of the software application, the autonomic manager monitors the values of its variables as well as the sequence of processes the application has executed. Sensors collect the software application state information, and a logic processor is used to perform the compliance analysis. Based upon the results of the analysis, the autonomic manager can take appropriate corrective actions including changing the values of variables and affecting the sequence of processes within the software application. The autonomic manager uses effectors in communication with the software application to affect the desired changes. The sensors and effectors are linked as non-invasive constructs to the software application and in aspect oriented programming constitute aspects. In order to prevent any adverse or undesirable effects to the software application as a result of the application state analysis and selected actions, a safety mechanism is included in communication with the effectors. The safety mechanism provides a set of constraints on the application states that could be changed or modified by the autonomic manager.

DETAILED DESCRIPTION

Figure 1:
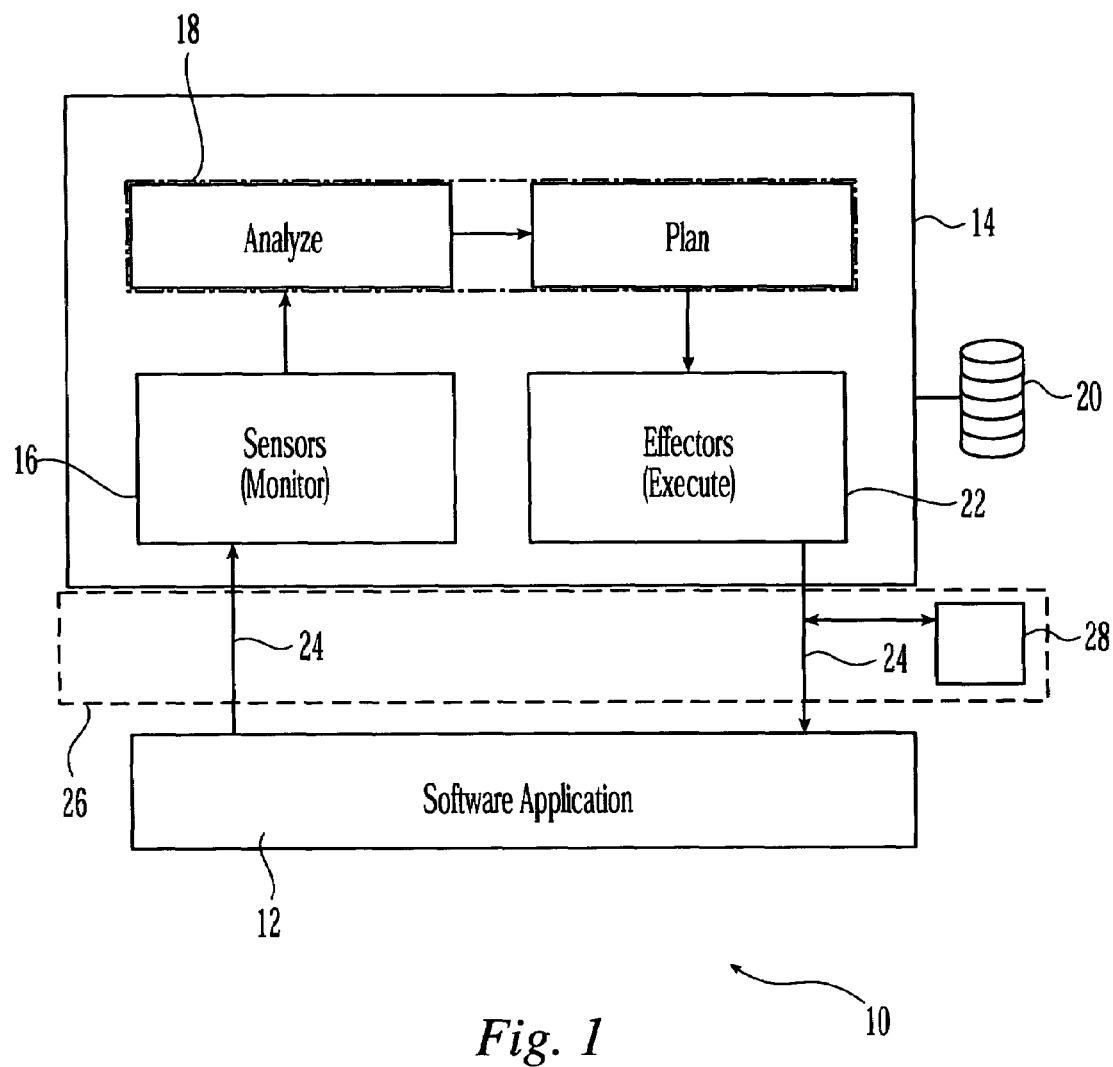
FIG. 1 is a schematic representation of an embodiment of a system in accordance with the present invention.

Referring initially to FIG. 1, an embodiment of a system 10 for monitoring application states of software applications in accordance with the present invention is illustrated. The system 10 includes at least one software application 12 in communication with an external software monitoring entity 14. Although illustrated as a single external entity in communication with a single software application 12, the external entity 14 can be in communication with a plurality of software applications.

The software application 12 is a computer readable code that when read and executed by a suitable computer processor performs the function for which the software application was developed. These functions include, but are not limited to, accounting functions, database management, time management, enterprise functions, plant or process control functions and monitoring functions including monitoring of environmental conditions. The software application can be written or developed in any suitable computer language including proprietary languages and commonly used languages such as JAVA. In general, the software application includes a source code that is compiled into native code or object code on the desired hardware platform. The software application contains one or more application states. An application state is the status, condition or value of a process, variable or setting in the software application 12.

The external entity 14 is in communication with the software application 12 and is capable of receiving information related to the application states and of affecting the value or status of those states. Preferably, the external entity 14 monitors the application states and executes the necessary corrective actions to the software application 12 without modifying any source code associated with the software application 12. In addition, the operation and control of the external entity is separate from and independent of the operation and control of the software application. In addition, the external entity 14 is independent of the hardware platform on which either the external entity 14 or software application 12 is being run. In one embodiment, the external entity 14 is an autonomic manager. The external entity 14 facilitates the external monitoring of a concern related to the software application 12, for example monitoring database storage usage by the software application 12. In one embodiment, the external entity 14 constitutes a single concern. In another embodiment, the external entity 14 contains a plurality of sub-concerns. The sub-concerns can be selectively applied to a given software application 12 that is being monitored. For example, each sub-concern can be selectively switched on and off. Therefore, not every sub-concern is applied to a given software application, allowing the external entity to monitor only the sub-concerns that are deemed relevant.

In one embodiment, the sub-concerns applied by the external entity can be user-selected, for example using a graphical user interface (GUI). The GUI lists all the parameters or application states in the software application that can be monitored. A user or system administrator selects one or more of the parameters for monitoring. In addition, the GUI presents the user with parameters in the software application where modifications are permissible and allows the user to enter a value, or alternatively to compute a value based on a built-in algorithm, in response to the results of monitoring and analysis of the application states.

In order to receive information or data related to the software application states being monitored by the external entity, the external entity 14 contains a sensor interface containing at least one and preferably a plurality of sensors 16 in communication with the software application 12. Each sensor 16 is an input into the external entity 14 and can be associated with a single application state or with a plurality of application states. The external entity 14 also includes a processor 18 in communication with the sensors 16 to analyze the application state information received from the sensors 16 for compliance with one or more pre-defined performance parameters. In addition, the processor 18 develops plans and selects actions based upon the analysis of the received application state information. Any suitable processor 18 capable of making the necessary analysis can be used. The pre-defined process parameters, potential actions and other necessary data including the computer readable code necessary for the operation of the external entity can be stored in a database 20 in communication with the external entity 14 and processor 18. The database 20 can be disposed either external to or internal to the external entity 14.

To affect the actions selected by the processor 18 in the software application 12, the external entity 14 includes an effector interface containing at least one and preferably a plurality of effectors 22 in communication with the processor 18 and the software application 12 to execute the selected actions within the software application 12. The actions include changes to application states, for example changing the value of a variable or initiating or ending a process.

Although the sensors 16 and effectors 22 can be in direct communication with the desired application states of the software application 12, preferably the system 10 includes a plurality of non-invasive constructs 24 disposed between the external entity 14 and the software application 12 and forming a cross-cutting layer 26 to cross-cut the external entity 14 and the software application 12. Each non-invasive construct 24 is in communication with at least one of the sensors 16 or effectors 22. The non-invasive constructs are added to the source code, byte code, native code or object code of the software application 12 to trace the execution sequence and to monitor the value of application state variables. Preferably, all of the code necessary for the operation of the non-invasive constructs is located external to both the software application and the sensors/effectors, providing a clean modular configuration and easier maintenance and implementation.

Figure 2:
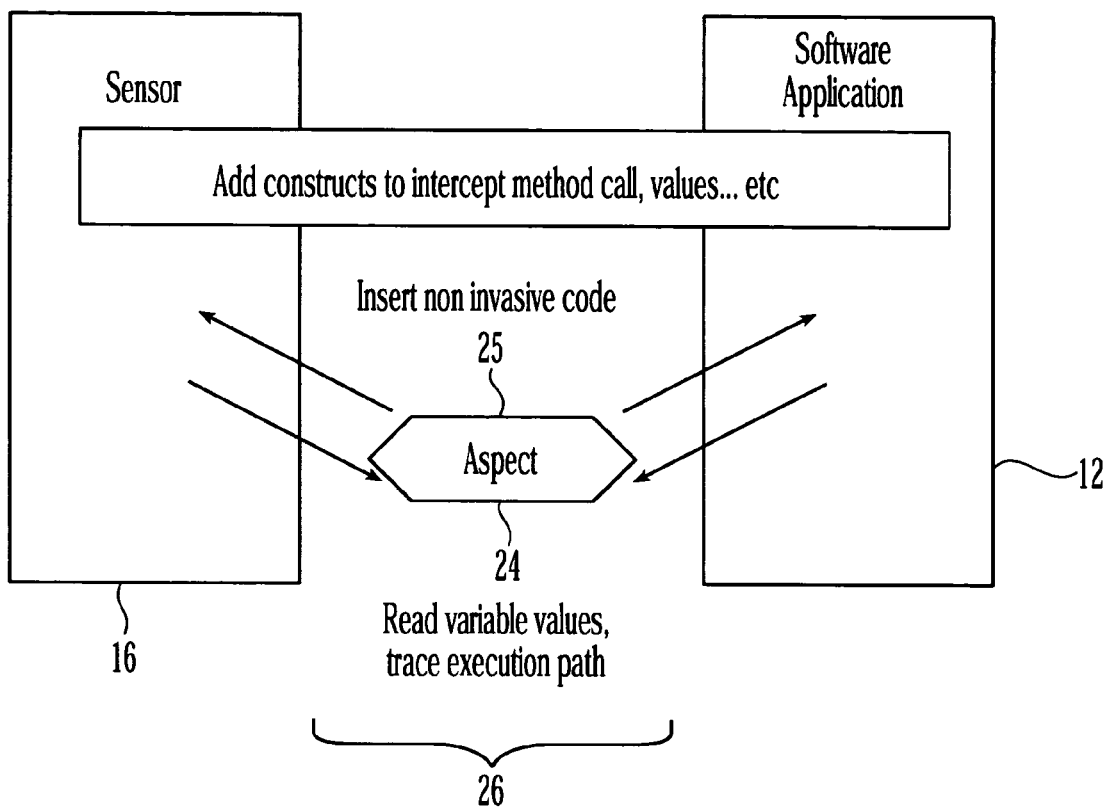
FIG. 2 is a schematic representation of a link between a sensor and a software application in accordance with the present invention.
Figure 3:
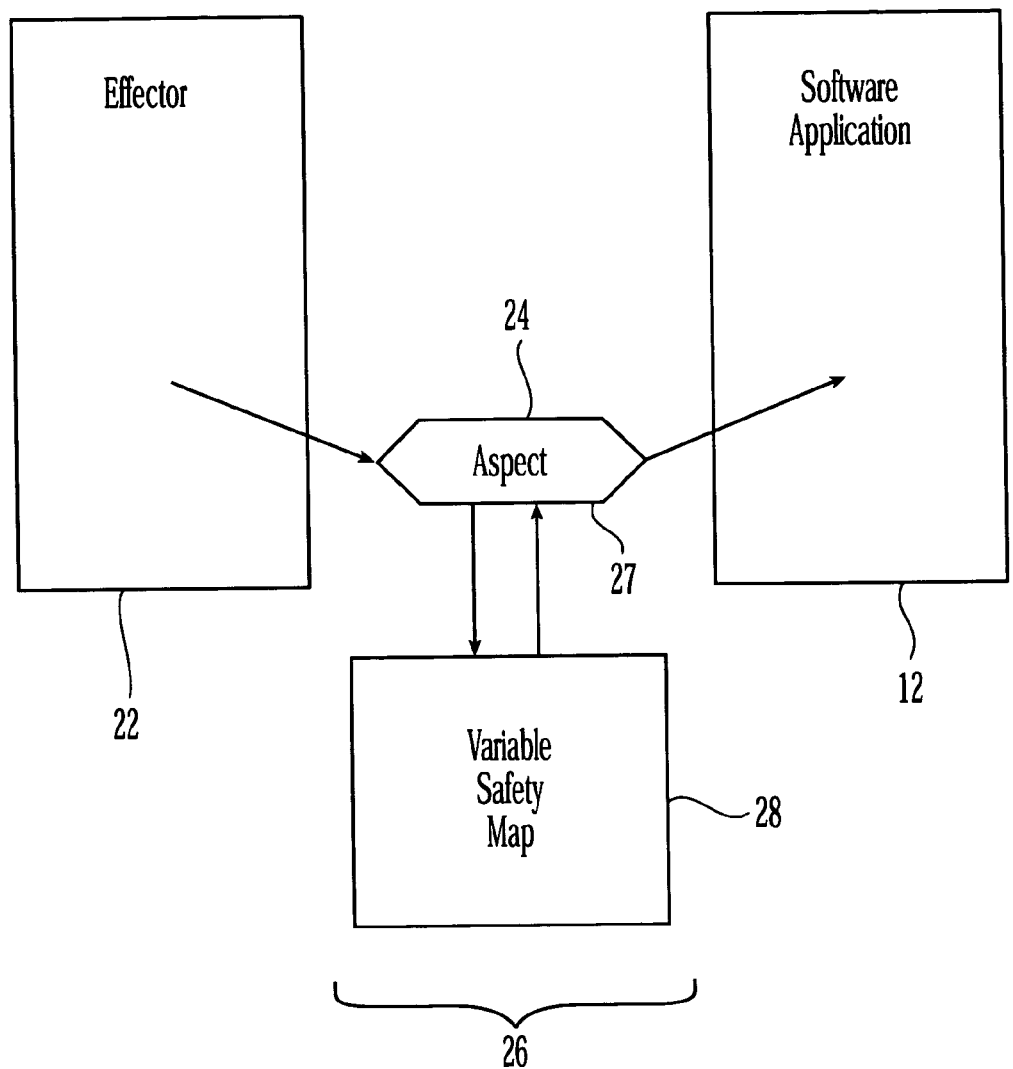
FIG. 3 is a schematic representation of a link between an effector and a software application in accordance with the present invention.

In one embodiment, the system 10 utilizes aspect oriented programming (AOP), and each non-invasive construct 24 constitutes an aspect. Examples of aspects include, but are not limited to, utilization of memory, call out to a sub-routine, receipt of a call from another program, receipt of data and utilization of processor capacity. The monitoring processes embodied in these aspects can be turned on or off via external, user-initiated controls. FIG. 2 illustrates an aspect 25 that has been cross-cut between a sensor 16 and the application 12. This aspect 25 provides for monitoring functions such as monitoring the value of variables and tracing the execution of processes within the software application 12. FIG. 3 illustrates an aspect 27 that has been cross-cut between the application 12 and an effector 22. This aspect 27 facilitates the execution of desired changes in the software application 12 in response to an analysis of the monitored application states.

Since the result of the analysis by the external entity 14 can result in the need to change the values of variables within the software application 12 or to otherwise affect the execution of process sequences within the software application 12 and altering variables or sequences can result in unpredictable or undesirable functioning of the software application 12, a guarantee or safety mechanism 28 is provided in communication with at least one of the non-invasive constructs 24 disposed between the effectors 22 and software application 12 to guarantee that an altered variable or process sequence does not result in undesired behavior and to prevent the selected action from adversely affecting operation of the software application 12. For example, the safety mechanism 28 determines if the changed value of a variable falls within acceptable range. In one embodiment, the safety mechanism 28 contains a pre-determined set of constraints for each changeable variable, and any proposed change to a variable is compared against the pre-determined constraints. These constraints can be generated using original design specifications, historical application state data, heuristic functions or other probabilistic means. When one of the effectors 22 initiates changes to a variable, the safety mechanism 28, using for example a variable map or graph containing the variable constraints, accepts or rejects the change. The safety mechanism checks that changes to the variable will not affect subsequent program behaviors and the changes are well defined and within the boundary of design limits.

Figure 4:
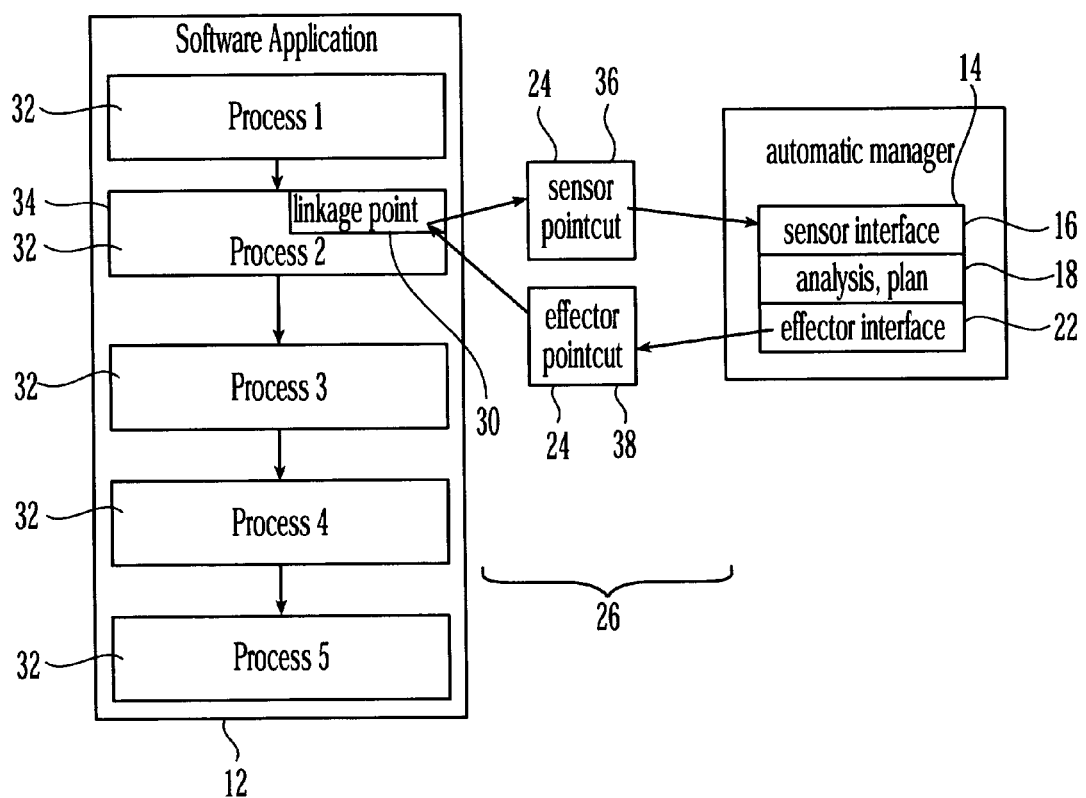
FIG. 4 is a schematic representation of another embodiment of a system in accordance with the present invention.

Referring to FIG. 4, an embodiment of the external entity 14 utilizing sensors 16 and effectors 22 to connect to a software application using AOP is illustrated. The software application 12 being monitored contains a plurality of processes 32 and is connected to the sensors 16 and effectors 22 of the external entity 18 via the aspect crosscut layer 26. In this embodiment, a JAVA programming system is used to build monitoring features and corrective actions in the legacy software application 12. The class files, in JAVA, are available, preferably with functional specifications and application program interface (API) documentation. The software application 12 is analyzed by an aspect programming tool, e.g. HyperJ, and monitoring code for the non-invasive construct 24 is linked at the point where cross cutting between the software application 12 and the external entity 14 is desired. This monitoring code can be linked, for example, at byte code level to allow application state variables to be read, analyzed and changed. In addition, the flow of the processes 32 in the software application 12 can be diverted to the external entity 14 to initiate actions, routines or processes, for example termination of the application, notification, calls, etc., that are not integrated into the legacy software application 12.

As illustrated in FIG. 4, a linkage point 30 in the software application 12 is identified. The non-invasive constructs 24 contain sensor point cuts 36 and effector point cuts 38 to connect the sensors 16 and effectors 22 to the linkage point 30 in the software application 12. As the processes 32 in the software application 12 are executed and the linkage point 30 in the second process 34 is reached, control is diverted to the sensor point cut 36 so that application state information can be collected for analysis by the external entity 14. Based upon the results of the analysis, the external entity initiates actions that are diverted back to the linkage point 30 in the second process 3 using the effector point cut 38. Alternatively, the desired actions can be initiated in other linkage points in the software application 12 or in other applications that are independent of and separate from the software application 12 being monitored or the external entity 14. In general, the effect of the analysis and actions are to change the operation of the software application 12 being monitored. The analysis and actions can also affect or initiate one or more other external applications.

In one example, the external entity 14 is an autonomic manager that monitors the utilization by the legacy software application of a set of storage devices and takes appropriate action should this utilization reach or exceed a predefined value. Utilization of the set of storage devices is defined as the number of connections to the storage devices multiplied by a utilization factor. In the case of a JAVA implementation, a "Device.connect" method of the "Device" object is called whenever a new connection is created. The desired information cannot be derived from the legacy software program, because there is no existing API which can be used to access this connection information.

Therefore, an aspect, called "Utilization", is defined, and a global variable "numberOfConnections" is declared to track the number of connections when the Device.connect method is called within the software program. The value of the global variable is delivered to the autonomic manager through a sensor.

An example of code implementing this example in AspectJ syntax is listed below. A point cut "newConnection" is first defined in the "Utilization" aspect. After the successful execution of the "Device.connect" method call, the static variable "numberOfConnections" is incremented, and the "setUtilizationFactor" method is invoked to forward the data to the autonomic manager. As illustrated, the original "Device" object source code does not need to be modified, and all the additional code required to support this monitoring capability is within the "Utilization" aspect.

```
public aspect Utilization {
    public static final long Device.FACTOR=0.2;
    public static long Device.numberOfConnection=0;
    // Define newConnection point cut
    point cut newConnection(Device d): call(* Device.connect (. .));
    // Define after advice for newConnection
    after(Device d) returning: newConnection(d) {
        // Increment number of connections
        // & calculate util factor
        d.numberOfConnection++;
        long util =d.numberOfConnection*d.FACTOR;
        executeRequestResponseOperation(
            "setUtilizationFactor", input, output, null);}
}
```

The present invention is also directed to methods for monitoring the application states of software applications 12. As used herein, an application state is the status, condition or value of a process, variable or setting in the software application 12. For example, an application state can be the value of a software application variable at a method entry or exit point. In one embodiment, legacy software applications are monitored for self-managing, i.e. autonomic, systems using an AOP approach that does not require modification of the source code of the legacy software application.

Preferably, the method of the present invention utilizes AOP or aspect oriented software development (AOSD), which facilitates the separation of concerns (SOC). SOC refers to the ability to identify, encapsulate, and manipulate only the parts of a software application that are relevant to a particular goal, concept or purpose. The techniques of AOP/AOSD facilitate the modularization and crosscutting of concerns in the system 10 using, for example, one or more aspects. Two concerns are said to crosscut if the methods related to those concerns intersect. Monitoring the execution of the software application can be defined as a concern and developed separately from the software application. In one embodiment, the methodologies of AOP can be used to include monitoring functions in development time, i.e. during the development and creation of the software application itself when the source code is available. General software tools such as AspectJ are well developed and readily available for use with the JAVA programming language during the development time.

For existing applications, where source code is not available, the same methodology can be applied, but at object code or native code level. For JAVA applications, before all classes (as class files) are loaded into the JAVA virtual machine (JVM), these classes are intercepted, analyzed and decomposed, and appropriate non-invasive constructs are linked in the JAVA byte code to provide application state information to the external entity. The linked constructs are non-invasive in that they do not affect the logic of the software program into which they are linked. A suitable software tool that provides the desired linking capabilities is HyperJ, which is commercially available from IBM Corp. of Armonk, N.Y. HyperJ supports "multi-dimensional" separation and integration of concerns in standard JAVA software.

In one embodiment, a method in accordance with the present invention monitors one or more application states associated with one or more software applications at run time for compliance with one or more pre-defined performance parameters. When the monitored application states are determined to be out of compliance with the pre-defined performance parameters, corrective actions are executed, also at application run time. The application states being monitored include application variables and sequences of processes executed in the software application. In order to provide the desired modularity and separation of concerns, either the monitoring of the application states or the executing of corrective actions is conducted without modifying any code associated with the software applications being monitored. Preferably, neither the monitoring of the application states nor the executing of corrective actions is conducted by modifying the software application code.

In one embodiment, monitoring of the application states includes monitoring the value of one or more application variables, monitoring the progress of one or more application process sequences and analyzing the monitored variables and sequences for compliance with the pre-defined performance parameters. In one embodiment, monitoring of the application variables and monitoring the application sequences are performed by an external entity that is separate from and independent of the software application being monitored and is also independent of the hardware platform on which the software application being monitored or the external entity is compiled and executed. In one embodiment, monitoring of the process variables and process sequences includes using one or more sensors contained in the external entity and in communication with the software application to receive the desired variable and sequence information.

The step of analyzing the monitored variables and sequences includes forwarding the information obtained from monitoring the software application to a logical processor such as a central processing unit contained within the external entity or accessible and controllable by the external entity. This processor can then analyze the information obtained against one or more pre-defined compliance parameters. These pre-defined parameters can be user-defined and user-entered and can be stored in one or more databases accessible by the external entity.

In one embodiment, the external entity is an autonomic manager. As used herein, an autonomic manager is an application or device that provides self-monitoring and control functionality to the software application including the ability to handle configuration, identify and fix ailments, allocate and optimize resources, and protect the software application from harm for example from a computer virus. In one embodiment, the method in accordance with the present invention includes creating an autonomic manager capable of monitoring the application states and executing the corrective actions and linking the autonomic manager to appropriate locations in the software application to facilitate monitoring the application states and executing the corrective actions. Preferably, the autonomic manager is capable of performing the steps of monitoring the application states, analyzing the application states for compliance with the pre-defined performance parameters, and executing the corrective actions. In one embodiment, the autonomic manager is created using an architecture neutral programming language. Suitable architecture neutral programming languages include JAVA.

In one embodiment, the step of linking the autonomic manager includes intercepting code associated with the software application, analyzing the intercepted code, identifying any application states within the application code, decomposing the identified application states and linking non-invasive constructs to the application code. In one embodiment, in order to link the non-invasive constructs the source code associated with the software application is modified. This embodiment is suitable when the actual source code is known and available, which typically occurs during the actual development of the software application being monitored. In another embodiment when the source code is not available or when it is not desirable or feasible to modify the source code, the non-invasive constructs are added without modifying the source code. In this embodiment, for example, the step of linking the non-invasive constructs can include modifying the object code or native code of the compiled software application. Preferably, the step of linking the non-invasive constructs includes using aspect oriented programming. Having created the autonomic manager as the external entity and linked the autonomic manager to the software application using one or more non-invasive constructs, the method of the present invention also includes providing application state information to the autonomic manager using the linked, non-invasive constructs.

In order to facilitate the desired autonomic control over application state conditions that are determined to be out of compliance with the pre-defined parameters, the method in accordance with the present invention provides for the execution of corrective actions. In one embodiment, the execution of corrective actions includes modifying at least one of the values of the application variables or the process sequences of the software application. Since changes to software application variables and process sequences can potentially cause undesirable consequences, the method in accordance with the present invention also includes preventing the corrective actions from adversely affecting operation of the software application. In one embodiment, preventing the corrective actions from adversely affecting operation includes using a variable map to constrain the corrective actions. In another embodiment, preventing the corrective actions from adversely affecting operation includes using a heuristic function to constrain the corrective actions.

The present invention is also directed to a computer readable medium containing a computer executable code that when read by a computer causes the computer to perform a method for monitoring application states of software applications in accordance with the present invention and to the computer executable code. The computer executable code can be stored on any suitable storage medium or database and executed on any suitable hardware platform as are known and available in the art.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for monitoring application states of software applications, the method comprising:

creating an autonomic manager comprising a plurality of sensors to receive data from a monitored software application and a plurality of effectors to affect actions within the monitored software application;

identifying linkage points within the monitored software application;

connecting sensors and effectors to the identified linkage points using non-invasive constructs disposed between the effectors and sensors and the monitored software application to form a cross-cutting layer comprising sensor point cuts and effector point cuts;

using the sensors to monitor application states associated with the monitored software application at run time for compliance with pre-defined performance parameters by diverting control to the sensor point cuts to collect application state information for analysis by the autonomic manager; and using the effectors to execute corrective actions at run time when the application states are out of compliance by using the effector point cuts to initiate the corrective actions;

wherein the non-invasive constructs are external to the sensors, the effectors and the monitored software application and do not modify any source code associated with the monitored software application.

2. The method of claim 1, wherein the step of using the sensors to monitor the application states comprises:
   monitoring values of application variables; and
   monitoring application process sequences; and
   the method further comprises analyzing the variables and sequences for compliance with the pre-defined performance parameters.

3. The method of claim 2, wherein the step of using the effectors to execute corrective actions further comprises modifying at least one of the values of the application variables and the process sequences.

4. The method of claim 1, wherein the sensor point cuts are disposed between the linkage points and the sensors and the effector point cuts are disposed between the linkage points and the effectors, and the method further comprises:
   diverting control to an appropriate sensor point cut to collect application state data from the monitored application when a given linkage point in the monitored software application is reached;
   analyzing the collected application state data in the autonomic manager; and
   using the appropriate effector point cut to divert actions initiated by the autonomic manager to the given linkage point to execute the corrective actions.

5. The method of claim 1, wherein the step of creating the autonomic manager comprises using an architecture neutral programming language to create the autonomic manager.

6. The method of claim 5, wherein the architecture neutral programming language comprises JAVA.

7. The method of claim 1, further comprising providing the application state information to the autonomic manager using the non-invasive constructs.

8. The method of claim 1, further comprising inhibiting the corrective actions from adversely affecting operation of the software application.

9. The method of claim 8, wherein the step of inhibiting the corrective actions from adversely affecting operation comprises using a variable map to constrain the corrective actions within acceptable bounds as defined by the variable map.

10. The method of claim 9, further comprising using historical application state information to generate the variable map.

11. The method of claim 8, wherein the step of inhibiting the corrective actions from adversely affecting operation comprises using a heuristic function to constrain the corrective actions within acceptable bounds as defined by the heuristic function.

12. A computer readable medium containing a computer executable code that when read by a computer causes the computer to perform a method for monitoring application states of software applications, the method comprising:
   creating an autonomic manager comprising a plurality of sensors to receive data from a monitored software application and a plurality of effectors to affect actions within the monitored software application;
   identifying linkage points within the monitored software application;
   connecting sensors and effectors to the identified linkage points using non-invasive constructs disposed between the effectors and sensors and the monitored software application to form a cross-cutting layer comprising sensor point cuts and effector point cuts;
   using the sensors to monitor application states associated with the monitored software application at run time for compliance with pre-defined performance parameters by diverting control to the sensor point cuts to collect application state information for analysis by the autonomic manager; and
   using the effectors to execute corrective actions at run time when the application states are out of compliance by using the effector point cuts to initiate the corrective actions;
   wherein the non-invasive constructs are external to the sensors, the effectors and the monitored software application and do not modify any source code associated with the monitored software application.

13. The computer readable medium of claim 12, wherein the step of using the sensors to monitor the application states comprises:
   monitoring values of application variables; and
   monitoring application process sequences; and
   the method further comprises analyzing the variables and sequences for compliance with the pre-defined performance parameters.

14. The computer readable medium of claim 13, wherein the step of using the effectors to execute corrective actions further comprises modifying at least one of the values of the application variables and the process sequences.

15. The computer readable medium of claim 12, wherein the sensor point cuts are disposed between the linkage points and the sensors and the effector point cuts are disposed between the linkage points and the effectors, and the method further comprises:
   diverting control to an appropriate sensor point cut to collect application state data from the monitored application when a given linkage point in the monitored software application is reached;
   analyzing the collected application state data in the autonomic manager; and
   using the appropriate effector point cut to divert actions initiated by the autonomic manager to the given linkage point to execute the corrective actions.

16. The computer readable medium of claim 12, wherein the step of creating the autonomic manager comprises using an architecture neutral programming language to create the autonomic manager.

17. The computer readable medium of claim 16, wherein the architecture neutral programming language comprises JAVA.

18. The computer readable medium of claim 12, further comprising providing the application state information to the autonomic manager using the non-invasive constructs.

19. The computer readable medium of claim 12, further comprising inhibiting the corrective actions from adversely affecting operation of the software application.

20. The computer readable medium of claim 19, wherein the step of inhibiting the corrective actions from adversely affecting operation comprises using a variable map to constrain the corrective actions within acceptable bounds as defined by the variable map.

21. The computer readable medium of claim 20, further comprising using historical application state information to generate the variable map.

22. The computer readable medium of claim 19, wherein the step of preventing the corrective actions from adversely affecting operation comprises using a heuristic function to constrain the corrective actions within acceptable bounds as defined by the heuristic function.

23. A system for monitoring application states of software applications. the system comprising:
- at least one software application comprising one or more application states and a plurality of linkage points;
- an external entity comprising at least a processor, in communication with and independent of the software application, the external entity comprising a plurality of sensors to receive data from a monitored software application and a plurality of effectors to affect actions within the monitored software application; and
- a plurality of non-invasive constructs connecting the sensors and effectors to the linkage points, the non-invasive constructs external to the sensors, the effectors and the software application and comprising a cross-cutting layer comprising sensor point cuts disposed between the linkage points and the sensors and effector point cuts disposed between the linkage points and the effectors.

24. The system of claim 23, wherein the external entity comprises an autonomic manager.

25. The system of claim 23, where in the external entity further comprises:
- a processor to analyze the application state information obtained by the sensors for compliance with one or more pre-defined performance parameters and to select actions to be executed by the effectors based upon the analysis of the application state information.

26. The system of claim 23, further comprising a guarantee mechanism in communication with at least one of the non-invasive constructs to prevent actions selected by the external entity from adversely affecting operation of the software application.

27. The system of claim 23, wherein the system utilizes aspect oriented programming and each non-invasive construct comprises an aspect.

28. The system of claim 23, wherein the external entity monitors one or more of a plurality of user-selectable concerns associated with the software application.

* * * * *